(12) United States Patent
Cha et al.

(10) Patent No.: US 11,383,702 B2
(45) Date of Patent: Jul. 12, 2022

(54) VEHICLE AND CONTROL METHOD THEREOF

(71) Applicants: Hyundai Motor Company, Seoul (KR); Kia Motors Corporation, Seoul (KR)

(72) Inventors: Jungmin Cha, Gyeonggi-do (KR); Jincheol Shin, Gyeonggi-do (KR); Jaeseok You, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 293 days.

(21) Appl. No.: 16/397,453

(22) Filed: Apr. 29, 2019

(65) Prior Publication Data
US 2020/0172092 A1 Jun. 4, 2020

(30) Foreign Application Priority Data
Nov. 29, 2018 (KR) .................. 10-2018-0150448

(51) Int. Cl.
| | | |
|---|---|---|
| H04B 1/00 | (2006.01) | |
| B60W 30/09 | (2012.01) | |
| B60W 30/095 | (2012.01) | |
| B60Q 9/00 | (2006.01) | |
| B60Q 5/00 | (2006.01) | |
| B60Q 1/50 | (2006.01) | |

(52) U.S. Cl.
CPC .............. *B60W 30/09* (2013.01); *B60Q 1/525* (2013.01); *B60Q 5/008* (2013.01); *B60Q 9/008* (2013.01); *B60W 30/0956* (2013.01); *F02N 2200/123* (2013.01)

(58) Field of Classification Search
None
See application file for complete search history.

(56) References Cited

U.S. PATENT DOCUMENTS

| | | | |
|---|---|---|---|
| 2007/0125589 A1* | 6/2007 | Murphy | B60R 21/013 180/274 |
| 2008/0147305 A1* | 6/2008 | Kawamata | B60W 50/0097 701/117 |
| 2013/0114827 A1* | 5/2013 | Lee | B60Q 5/008 381/86 |
| 2014/0056438 A1* | 2/2014 | Baalu | G10K 15/02 381/86 |
| 2014/0309864 A1* | 10/2014 | Ricci | G01C 21/365 701/36 |
| 2018/0017962 A1* | 1/2018 | Miller | B60W 30/00 |
| 2019/0163176 A1* | 5/2019 | Wang | G05D 1/0061 |
| 2019/0339706 A1* | 11/2019 | Batur | G06T 7/20 |
| 2019/0381977 A1* | 12/2019 | Kanagarajan | B60T 8/1703 |

* cited by examiner

*Primary Examiner* — Brent Swarthout
(74) *Attorney, Agent, or Firm* — Fox Rothschild LLP

(57) ABSTRACT

A vehicle is provided to improve driving and pedestrian safety. The vehicle includes a position receiver that receives a position of the vehicle and a communicator that receives map information including Green Zone position information. A controller operates the vehicle to travel in a Green Zone mode from a section start point of a Green Zone to a section end point of the Green Zone when it is predicted that the vehicle enters the Green Zone from the position of the vehicle received from the position receiver.

18 Claims, 9 Drawing Sheets

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2018-0150448, filed on Nov. 29, 2018, the disclosure of which is incorporated by reference herein in its entirety.

BACKGROUND

1. Technical Field

The present disclosure relates to a vehicle and a control method thereof, and more particularly, to a vehicle and a control method thereof that improve pedestrian safety around an eco-friendly vehicle.

2. Description of the Related Art

A vehicle is a transporting apparatus that is driven on a road by driving wheels. A vehicle typically includes an internal combustion engine vehicle (general engine vehicle) that generates mechanical power by burning petroleum fuel such as gasoline and diesel oil and is driven using the mechanical power, and an eco-friendly vehicle that uses electricity as a power source to reduce fuel consumption and harmful gas emissions.

The eco-friendly vehicle includes an electric vehicle that has a battery and a motor as a rechargeable power source unit and rotates the electric motor using electricity stored in the battery and operates the wheels using the rotation of the motor, a hybrid vehicle that includes an engine, a battery, and a motor and operates by controlling the mechanical power of the engine and the electrical power of the motor, and a hydrogen fuel cell vehicle.

The hybrid vehicle may be driven in an electric vehicle (EV) mode using only the power of the motor, or in a hybrid electric vehicle (HEV) mode using the power of the engine and the power of the motor, and performs a regenerative braking in which braking and inertia energy are recovered through the power generation operation of the motor to charge the battery during braking or coasting by inertia. However, a safety accident may occur in these vehicles since it may be difficult for the pedestrians around the vehicle to perceive the existence of the vehicle due to the minimal driving noise of the vehicle compared to the internal combustion engine vehicle.

SUMMARY

The present disclosure provides a vehicle and a control method thereof capable of preventing safety accidents or collisions with pedestrians in advance that frequently occur due to low driving noise of an eco-friendly vehicle. Another aspect of the present disclosure provides a vehicle and a control method thereof that facilitate a pedestrian to recognize an eco-friendly vehicle by providing an emergency lighting or a virtual engine sound to warn the pedestrian when the eco-friendly vehicle enters a Green Zone.

Additionally, another aspect of the present disclosure provides a vehicle and a control method thereof that prevent safety accidents with pedestrians in advance that frequently occur by arbitrarily restricting a vehicle speed when an eco-friendly vehicle enters a Green Zone. Additional aspects of the present disclosure will be set forth in part in the description which follows and, in part, will be obvious from the description, or may be learned by practice of the present disclosure.

In accordance with an aspect of the present disclosure, a vehicle may include a position receiver configured to receive the position of the vehicle, a communicator configured to receive map information including Green Zone position information, and a controller configured to operate the vehicle to travel in a Green Zone mode from a section start point of a Green Zone to a section end point of the Green Zone when it is predicted that the vehicle enters the Green Zone from the position of the vehicle received from the position receiver. The controller may further be configured to decelerate the vehicle from a preset distance before the vehicle enters the Green Zone so that the vehicle travels at a speed limit from the section start point of the Green Zone to the section end point of the Green Zone.

The vehicle may further include a virtual engine sound system (VESS). The controller may be configured to vary the volume of the virtual engine sound system to a first threshold value when the Green Zone is in an indoor area, and vary the volume of the virtual engine sound system to a second threshold value greater than the first threshold value when the Green Zone is in an outdoor area. The controller may also be configured to warn a driver or a pedestrian by turning on an emergency light of the vehicle or an indicator lamp of the vehicle when the vehicle enters the Green Zone. The controller may be configured to execute regenerative braking of the vehicle to a maximum level when the vehicle enters the Green Zone.

The vehicle may further include an input unit configured to receive a Green Zone mode selection input from a driver. The controller may be configured to operate the vehicle to travel in the Green Zone mode in response to receive the driver selection of the Green Zone mode. The vehicle may further include a sensor unit configured to sense obstacles in the vicinity of the vehicle. The controller may be configured to detect that the vehicle has entered the Green Zone when a pedestrian is sensed in the vicinity of the vehicle by the sensor unit. The sensor unit may include an image obtainer configured to photograph an obstacle including a pedestrian in the vicinity of the vehicle, or a speed limit sign in the vicinity of the vehicle. The controller may then be configured to operate the vehicle to decelerate from the section start point of the Green Zone to the section end point of the Green Zone to a speed limit of the photographed speed limit sign in the vicinity of the vehicle. The controller may be configured to operate the vehicle to travel in the Green Zone mode until a driver selection to turn the Green Zone mode off is received.

In accordance with another aspect of the present disclosure, a vehicle control method may include receiving the position of a vehicle, receiving map information including Green Zone position information, and operating the vehicle to travel in a Green Zone mode from a section start point of a Green Zone to a section end point of the Green Zone when it is predicted that the vehicle enters the Green Zone from the received position of the vehicle. The operating of the vehicle to travel in the Green Zone mode from the section start point of the Green Zone to the section end point of the Green Zone may include decelerating the vehicle from a preset distance before the vehicle enters the Green Zone so that the vehicle travels at a speed limit from the section start point of the Green Zone to the section end point of the Green Zone.

The vehicle control method may further include operating a virtual engine sound system (VESS). The operating of the vehicle to travel in the Green Zone mode from the section start point of the Green Zone to the section end point of the Green Zone may include varying the volume of the virtual engine sound system to a first threshold value when the Green Zone is in an indoor area, and varying the volume of the virtual engine sound system to a second threshold value greater than the first threshold value when the Green Zone is in an outdoor area. The operating of the vehicle to travel in the Green Zone mode from the section start point of the Green Zone to the section end point of the Green Zone may include warning a driver or a pedestrian by turning on an emergency light of the vehicle or an indicator lamp of the vehicle when the vehicle enters the Green Zone.

Additionally, the operating of the vehicle to travel in the Green Zone mode from the section start point of the Green Zone to the section end point of the Green Zone may include adjusting a regenerative braking of the vehicle to a maximum level when the vehicle enters the Green Zone. The vehicle control method may further include receiving a Green Zone mode selection input of a driver, and operating the vehicle to travel in the Green Zone mode in response to receiving the driver selection of the Green Zone mode.

The vehicle control method may further include sensing obstacles in the vicinity of the vehicle, and recognizing that the vehicle has entered the Green Zone when a pedestrian is sensed in the vicinity of the vehicle. The sensing of the obstacles in the vicinity of the vehicle may include photographing an obstacle including a pedestrian in the vicinity of the vehicle, or a speed limit sign in the vicinity of the vehicle. The vehicle control method may further include operating the vehicle to decelerate from the section start point of the Green Zone to the section end point of the Green Zone to a speed limit of the photographed speed limit sign in the vicinity of the vehicle. Additionally, the vehicle control method may include operating the vehicle to travel in the Green Zone mode until a driver selection is received to turn the Green Zone mode off.

BRIEF DESCRIPTION OF THE DRAWINGS

These and/or other aspects of the present disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

Figure 1:
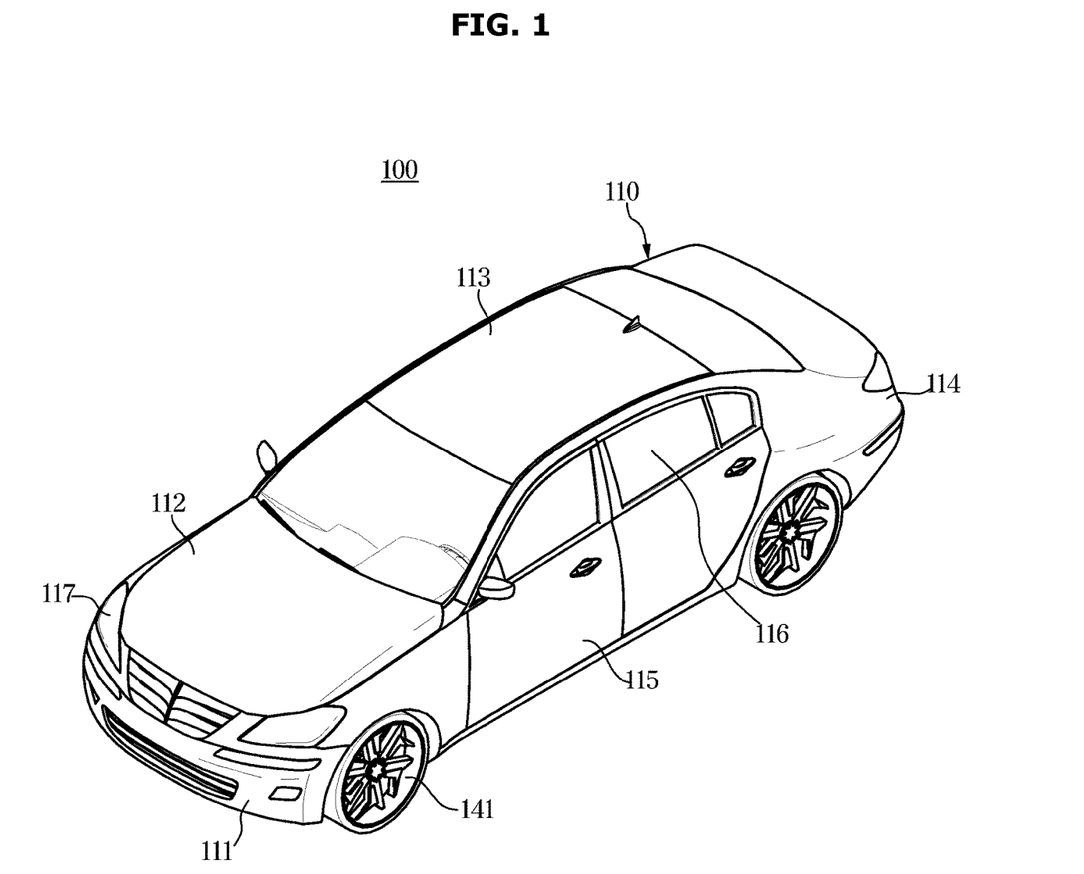
FIG. 1 is an external view of a vehicle body of a vehicle according to an exemplary embodiment of the present disclosure.
Figure 2:
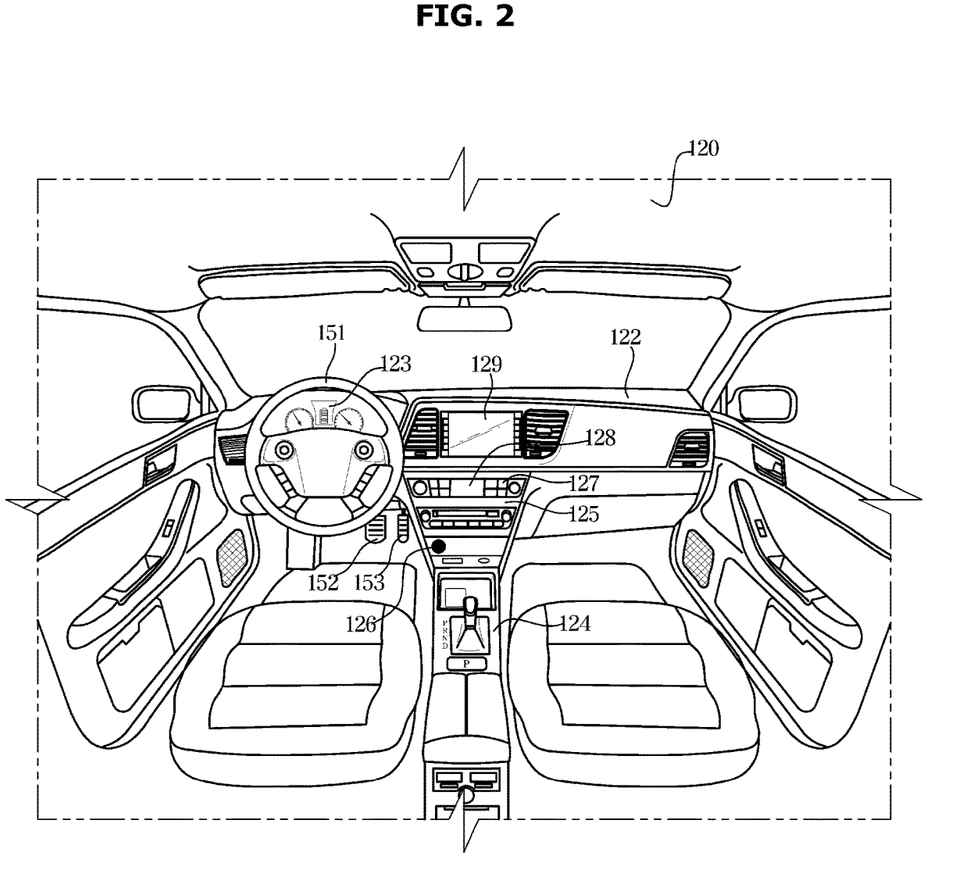
FIG. 2 is an internal view of a vehicle body of a vehicle according to an exemplary embodiment of the present disclosure.
Figure 3:
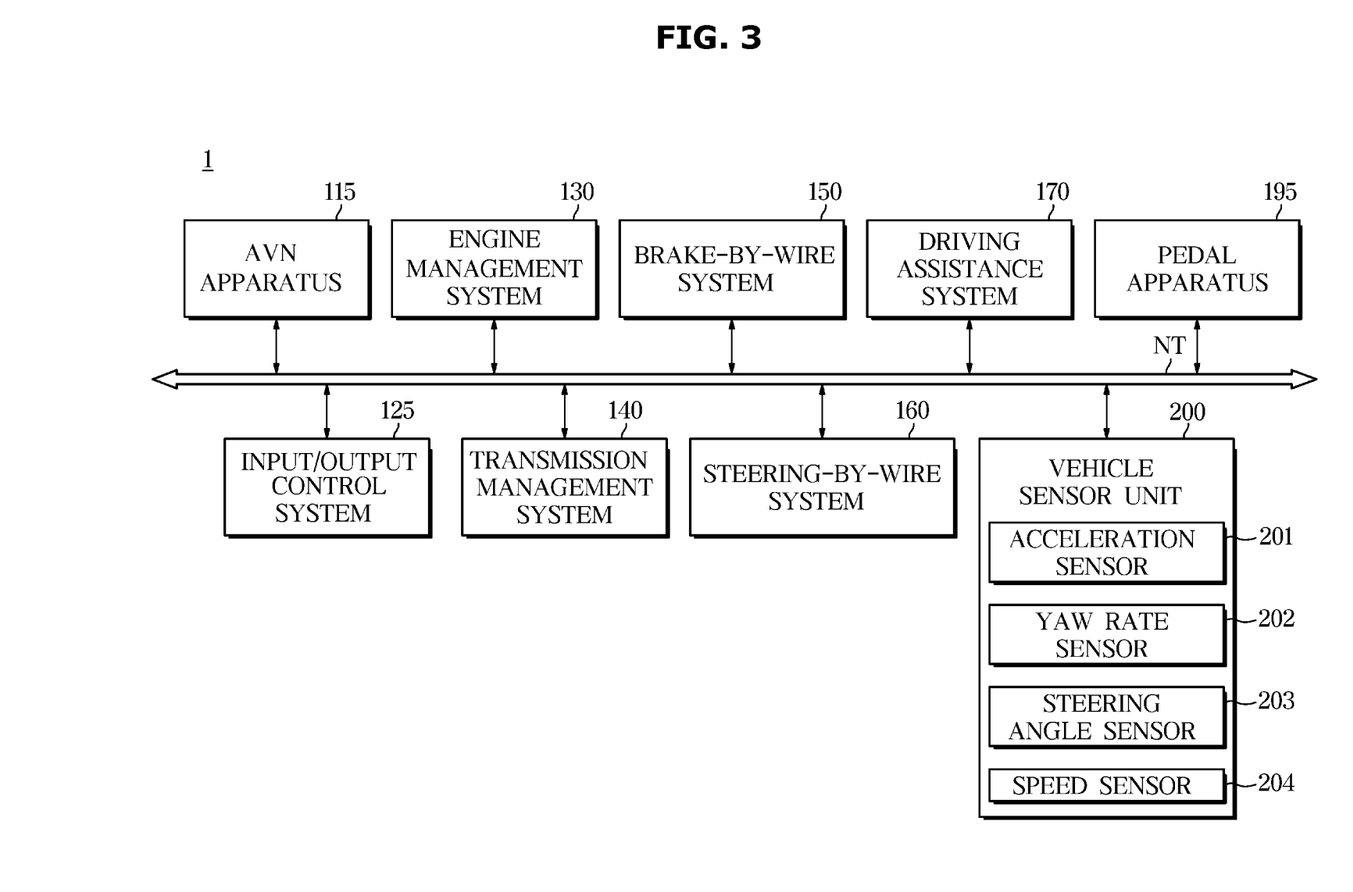
FIG. 3 is a diagram illustrating various electric apparatuses included in a vehicle according to an exemplary embodiment of the present disclosure.

FIG. 1 is an external view of a vehicle body of a vehicle according to an exemplary embodiment of the present disclosure, FIG. 2 is an internal view of a vehicle body of a vehicle according to an exemplary embodiment of the present disclosure, and FIG. 3 is a diagram illustrating various electric apparatuses included in a vehicle according to an exemplary embodiment of the present disclosure.

A vehicle 100 according to an exemplary embodiment of the present disclosure is an eco-friendly vehicle, and may be a plug-in hybrid electric vehicle (PHEV) that includes an engine, a battery, and a motor and is driven by adjusting the mechanical power of the engine and the electric power of the motor. The vehicle 100 according to an exemplary embodiment of the present disclosure includes a vehicle body having an outer shell 110 and an inner shell 120, and a chassis, which is a remaining portion except the vehicle body, on which mechanical apparatuses necessary for traveling are installed.

As illustrated in FIG. 1, the outer shell 110 of the vehicle body includes a front panel 111, a bonnet 112, a roof panel 113, a rear panel 114, front, rear, left and right doors 115, and window glasses 116 disposed at the front, rear, left and right doors 115 to be openable and closable. The outer shell 110 of the vehicle body also includes a filler disposed at a boundary between each of the doors 115 and each of the window glasses 116, side mirrors for providing the driver with a view behind the vehicle 100, and lamps 117 to illuminate the surrounding environment and functioning as a signal and communication for other vehicles and pedestrians.

As illustrated in FIG. 2, the inner shell 120 of the vehicle body includes a seat 121 on which a passenger may sit, a dashboard 122, an instrument panel 123 (i.e., a cluster) disposed on the dashboard 122, a center fascia 124 in which air outlets and adjusting plates of an air conditioner are disposed, a head unit 125 disposed on the center fascia 124 and configured to receive an operation command of an audio equipment and the air conditioner, and a starter 126 disposed on the center fascia 124 and configured to receive a start command. A tachometer, a speedometer, a coolant thermometer, a fuel meter, turn signal indicators, an up-light indicator, a warning light, a seat belt warning light, an odometer, a shift lever indicator, a door open warning light, an engine oil warning light, and a fuel shortage warning light are disposed on the cluster 123.

The vehicle 100 may further include a shift lever disposed on the center fascia 124 to receive an operation position, and a parking button (e.g., EPB button) disposed around the shift lever or on the head unit 125 to receive an operation command of an electronic parking brake apparatus (not shown). The vehicle 100 may further include an input unit 127 configured to receive operation commands of various functions. The input unit 127 may be disposed on the head unit 125 and the center fascia 124 and may include at least one physical button such as operation on/off buttons for various functions, buttons for changing setting values of various functions, and the like. The input unit 127 may further include a jog dial (not shown) or a touch pad (not shown) for inputting a movement command and a selection command of a cursor displayed on a display of a user interface 129. Herein, the jog dial or the touch pad may be disposed on the center fascia 124, and the like.

Additionally, the vehicle 100 may include a display unit 128 disposed on the head unit 125 to display information regarding functions performed in the vehicle 100 and information input by the user. The display unit 128 may be configured to display any one of an electric vehicle mode (i.e., an EV mode) and a hybrid electric vehicle mode (i.e., an HEV mode), which is the current driving mode of the vehicle 100. The vehicle 100 may further include the user interface 129 for the convenience of the user. The user interface 129 may also be configured to display information regarding the function that is performing and information input by the user.

The user interface 129 may be provided as a touch screen in which a touch panel and a display panel are integrated to perform both an input function and a display function and may be provided only as a display panel to perform only a display function. Accordingly, the user may select a desired function through the touch input of the touch screen with respect to the selectable functions displayed on the user interface 1:29.

Further, a plurality of wheels 141 disposed on the front, rear, left and right sides of the vehicle 100, power apparatuses configured to generate a driving force necessary for operating the vehicle 100 and regulating the generated driving force and configured to apply a controlled driving force to each of the wheels 141, a steering apparatus, a braking apparatus configured to apply a braking force to each of the wheels 141, and a suspension system may be disposed on the chassis of the vehicle 100, which is a frame for supporting the vehicle body (e.g., the outer and inner shells 110 and 120).

As illustrated in NG. 3, the vehicle 100 may include electronic equipment 1. The electronic equipment 1 shown in FIG. 3 may include an audio/video/navigation (AVN) apparatus 115, an input/output control system 120, an engine management system (EMS) 130, a transmission management system (TMS) 140, a brake-by-wire system 150, a steering-by-wire system 160, a driving assistance system 170, a vehicle control system (not shown), a pedal apparatus 195, a vehicle sensor unit 200, and the like. However, the electronic apparatuses shown in FIG. 2 are only a part of the electronic apparatuses included within the vehicle 100, and the vehicle 100 may be provided with more various electronic apparatuses.

The electronic equipment 1 included in the vehicle 100 may be configured to communicate with each other via a vehicle communication network NT, The vehicle communication network NT may employ communication protocols of a MOST (Media Oriented Systems Transport) having a communication speed of up to 24.5 Mbps (Mega-bits per second), a FlexRay having a communication speed of up to 10 Mbps, a CAN (Controller Area Network) having a communication speed of 125 kbps (kilo-bits per second) to 1 Mbps, a LIN (Local Interconnect Network) having a communication speed of 20 kbps, and the like. Such vehicle communication network NT may employ not only a single communication protocol such as the MOST, the FlexRay, the CAN, and the LIN but also a plurality of communication protocols.

The AVN apparatus 115 is an apparatus configured to output music or video based on a control command from the driver. Specifically, the AVN apparatus 115 may be configured to reproduce music or video based on a control command of the driver or provide a guide of a route toward a destination received from a navigation system (not shown). The input/output control system 120 may be configured to receive the driver's control command via a button and display information corresponding to the driver's control command. The input/output control system 120 may include a cluster display disposed on the dashboard 122 to display images, a head-up display to project images on a windscreen, a wheel button module mounted on a steering wheel, and the like.

Accordingly, the vehicle 100 including the input/output control system 120 according to an exemplary embodiment of the present disclosure may show the operation state of the vehicle control system for driver confirmation. The engine management system 130 may be configured to perform fuel injection control, fuel ratio feedback control, lean-burn control, ignition timing control, idling control, and the like. The engine management system 130 may be a single apparatus, or may be a plurality of apparatuses connected via communication.

The transmission management system 140 may be configured to perform shifting point control, damper clutch control, pressure control during friction clutch on/off, and engine torque control during shifting. The transmission management system 140 may be a single apparatus, or may be a plurality of apparatuses connected through communication. Additionally, the brake-by-wire system 150 may be configured to adjust and execute the braking of the vehicle 100, and may typically include an anti-lock brake system (ABS) or the like. The steering-by-wire system 160 assists the steering operation of a driver by reducing the steering force during low-speed driving or parking and by increasing the steering force during high-speed driving.

The driving assistance system 170 assists the driving of the vehicle 1 and may be configured to perform a forward collision avoiding function, a lane departure warning function, a blind spot monitoring function, a rearward monitoring function, and the like. The driving assistance system 170 may include a plurality of apparatuses connected via communication. For example, the driving assistance system 170 may include a forward collision warning system (FCW) configured to detect a vehicle traveling in the same direction ahead of the driving lane (e.g., detect a vehicle being driven in the driving lane forward of the subject vehicle) and configured to avoid collision with a forward vehicle, an advanced emergency braking system (AEBS) configured to cushion or minimize impact when a collision with a forward vehicle is inevitable, an adaptive cruise control (ACC) configured to detect a vehicle traveling in the same direction ahead of the driving lane and automatically accelerate or decelerate based on the speed of the forward vehicle, a lane departure warning system (LDWS) configured to prevent departure from the driving lane, a lane keeping assistance system (LKAS) configured to operate the vehicle to return to the driving lane (e.g., an original driving lane) in response to determining that the vehicle (e.g., subject vehicle) deviates the driving lane, a blind spot detection (BSD) configured to provide the driver with information regarding a vehicle located in a blind spot, a rear-end collision warning system (RCW) configured to detect a vehicle traveling in the same direction behind the driving lane and avoid an impulse with a rearward vehicle, and the like.

The pedal apparatus 195 includes a brake pedal (not shown) and an accelerator pedal (not shown). The brake pedal is a pedal that may be operated by the foot of the driver to brake the vehicle, and may push a piston of a master cylinder to generate hydraulic pressure to thus decelerate the vehicle. It may be possible to determine the braking intention of the driver by measuring a pedal effort (e.g., amount of force exerted onto the pedal) for operating the brake pedal with the foot of the driver using a pedal effort sensor (not shown).

Additionally, the accelerator pedal is a pedal that may be operated by the foot of the driver to accelerate the vehicle, and when the accelerator pedal is depressed or engaged, the rotation of an engine linked to a carburetor (not shown) inside the vehicle speeds up and thus, the vehicle may be accelerated. It may be possible to determine the accelerating intention of the driver by measuring a pedal effort for operating the accelerator pedal with the foot of the driver with a pedal effort sensor (not shown). The vehicle sensor unit 200 included within the vehicle 100 may include an acceleration sensor 201, a yaw rate sensor 202, a steering angle sensor 203, a speed sensor 204, and the like to detect the driving information of the vehicle 100.

In particular, the acceleration sensor 201 may be configured to measure the acceleration of the vehicle 100 and may include a lateral acceleration sensor (not shown) and a longitudinal acceleration sensor (not shown). The yaw rate sensor 202 may be installed on each wheel of the vehicle 100 and may be configured to detect a yaw rate value in real time. The steering angle sensor 203 configured to measure a steering angle may be mounted on a lower portion of a steering wheel 60, and may be configured to detect a steering speed, a steering direction and a steering angle of the steering wheel 151. The speed sensor 204 may be mounted inside the wheel of the vehicle 100 to detect a rotational speed of the wheel. Various sensors included within the vehicle sensor unit 200 configured to sense the state of the vehicle 100 are not limited to the acceleration sensor 201, the yaw rate sensor 202, the steeling angle sensor 203 and the speed sensor 204, and the vehicle sensor unit 200 may further include various sensors in addition to the above sensors. The vehicle 100 may include control configurations of the vehicle 100 according to an exemplary embodiment of the present disclosure, including some configurations of the electronic equipment 1.

Figure 4:
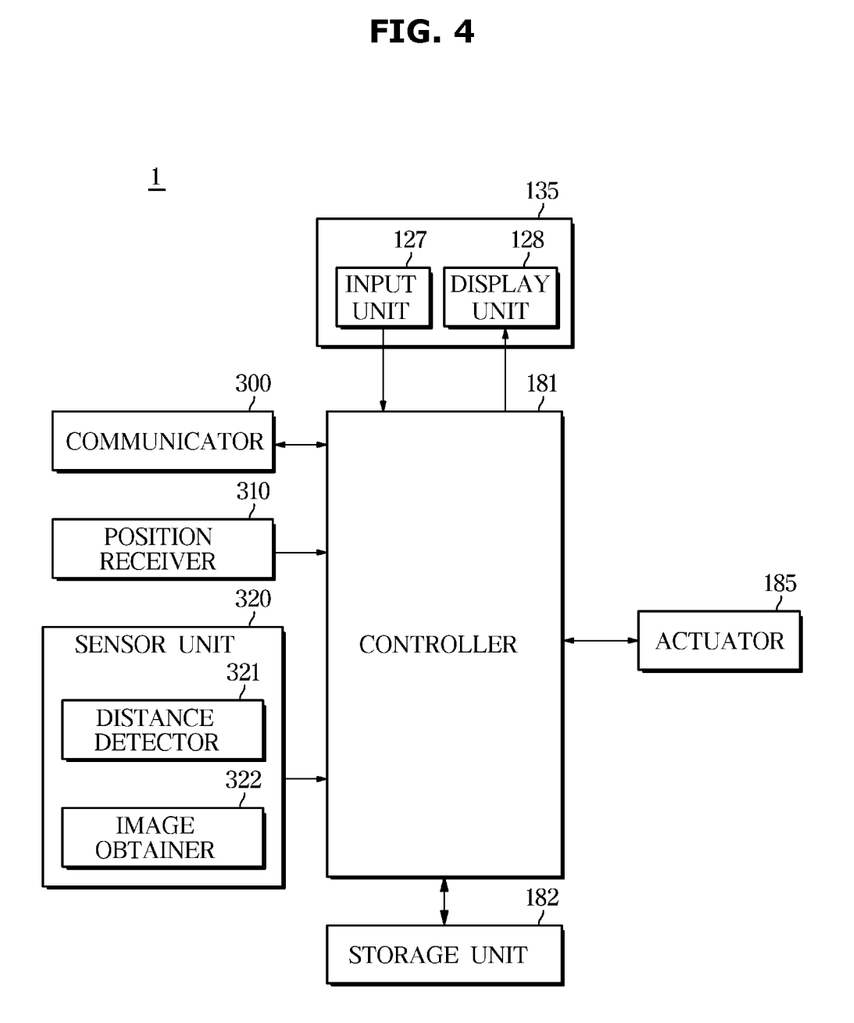
FIG. 4 is a control configuration diagram of a vehicle according to an exemplary embodiment of the present disclosure.

FIG. 4 is a control configuration diagram of a vehicle according to an exemplary embodiment of the present disclosure. Specifically, the vehicle 100 may include a communicator 300 configured to communicate with various electric devices in the vehicle 100 or receive information from a server outside the vehicle 100, a position receiver 310 configured to obtain position information of the vehicle 100, a sensor unit 320 configured to detect obstacle information around the vehicle 100, a controller 181 configured to collectively operate the vehicle 100, an actuator 185 for driving the vehicle 100 based on a control signal of the controller 181, and a storage unit 182.

A terminal 135 included within the vehicle 100 may be configured to receive information regarding an audio function, a video function, a digital media broadcasting (DMB) function, a radio function, a navigation mode, and the autonomous driving mode, and may be configured to display operation information regarding the function or mode that is performing. For example, the terminal 135 in the vehicle 100 may be configured to display images in the front, rear, left, and right directions sensed using the sensor unit 320. The terminal 135 may include the input unit 127 and the display unit 128. The input unit 127 of the terminal 135 may be a touch panel, and the display unit 128 may be a display panel. The terminal 135 may be provided as a touch screen in which the touch panel and the display panel are integrated.

Additionally, the terminal 135 may include only a display panel, which is the display unit 128, and in this case the terminal 135 may be configured to receive operation information and an operation command via the input unit 127 disposed on the center fascia 124 of the vehicle 100. For example, the terminal 135 may be configured to receive an estimated parking time from the user via the input unit 127 of the terminal 135. The display unit 128 of the terminal 135 may be configured to display a temperature inside the vehicle 100 when the vehicle 100 is parked. In addition, the terminal 135 may be configured to communicate with the controller 181 to execute the navigation mode and the autonomous driving mode, and perform a display operation based on the control command of the controller 181 received via communication.

In particular, the terminal 135 may be configured with the user interface 129 described above with reference to FIG. 2 to display an image for the user's selection on the screen to induce the user's selection, and may be configured to receive input the user's selection. The communicator 300 may include one or more components that enable communication with an external device. For example, the communicator 300 may include at least one of a short-range communication module, a wired communication module, and a wireless communication module.

Accordingly, the vehicle 100 may be configured to communicate with the external device of the communicator 300 to secure a peripheral precision map of the current position. The peripheral precision map refers to detailed map information such as lane information including a driving lane, a travelable route, and a driving direction. For example, the communicator 300 may be configured to obtain map information regarding a Green Zone that requires pedestrian protection in the navigation position information. The Green Zone refers to an area where vehicle deceleration is required, such as the School Zone which is a child protection zone.

Accordingly, areas that require deceleration by law such as a child protection zone or an elderly protection zone, or parking lots, hospitals, parks, and narrow alleys that require slowing down for safety and pedestrian protection may be areas that correspond to the Green Zone. However, the areas included in the definition previously set in the controller 181, which will be described later, may correspond to the Green Zone, and it may be possible to change, delete or add the areas included in the definition previously set in the controller 181. Therefore, as described above, the areas corresponding to the Green Zone may be changed, deleted, or added according to the definition previously set in the controller 181, and it may be determined whether it corresponds to the Green Zone based on the information sensed using the sensor unit 320, even if it is not an area corresponding to the Green Zone.

In other words, in response to determining that the vehicle 100 enters an area that corresponds to the Green Zone based on the information acquired by the controller 181, which will be described later, using the sensor unit 320, the controller 181 may be configured to operate the vehicle 100 to travel in the Green Zone mode. For example, when the running speed limit of the signboard in the image photographed using an image obtainer 322 (e.g., imaging device, camera, etc.) is equal to or less than a preset threshold value or when a pedestrian or the like is detected using the radar or the rider sensor of a distance detector 321, the controller 181 may be configured to determine that it corresponds to the Green Zone. Accordingly, the communicator 300 may be configured to acquire the information regarding the Green Zone included in the secured map information and transmit the information regarding the Green Zone to the controller 181, and the sensor unit 320 may also be configured to sense a situation that corresponds to the Green Zone and transmit the sensed information to the controller 181.

Based on the information regarding the Green Zone in the map secured through the communicator 300 and the current position information of the vehicle 100 secured through the position receiver 310, the controller 181 may be configured to operate a vehicle control unit (VCU) included within the vehicle 100. In other words, the controller 181, which is a single vehicle control unit (VCU), may be a CPU or an MCU, and may be a processor. The controller 181 may be implemented with a memory (not shown) configured to store an algorithm for adjusting the operation of components in a vehicle or data for a program reproducing the algorithm, and a processor (not shown) configured to perform the above operation using data stored in the memory. In particular, the memory and the processor may be implemented as separate chips, or may be implemented as a single chip.

Figure 5:
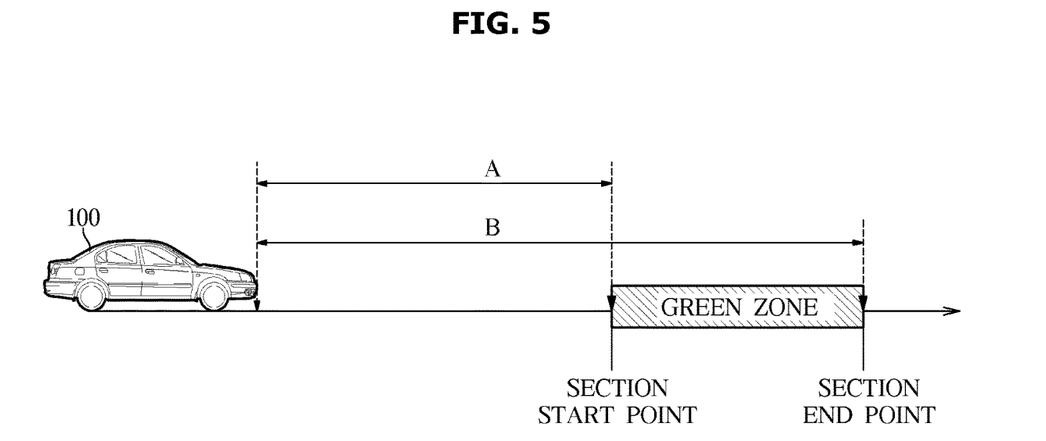
FIG. 5 is a schematic view illustrating a vehicle entering a Green Zone according to an exemplary embodiment of the present disclosure.

As illustrated in FIG. 5, the controller 181 may be configured to acquire information regarding the Green Zone, specifically, information regarding the attribute of the Green Zone (e.g., information regarding which area corresponds to among a child protection area, a parking lot, a park, and a hospital). Herein, the information regarding the Green Zone may include a section start point and a section end point of the Green Zone from the current vehicle position, and a section distance of the Green Zone.

Accordingly, the controller 181 may be configured to calculate a remaining distance A to the section start point of the Green Zone from the current vehicle position and a remaining distance B to the section end point of the Green Zone from the current vehicle position. The controller 181 may also be configured to inform the user of the entry of the vehicle's Green Zone when the current vehicle enters the section start point of the Green Zone. For example, the controller 181 may be configured to display through the display unit 128 that the current vehicle 100 has entered the Green Zone. In addition, it may be possible to display on the display unit 128, an image through which the driver may select whether to execute a Green Zone mode upon entering the Green Zone, via the terminal 135, and to receive the user's selection via the input unit 127. An example of this will be described below.

Figure 6:
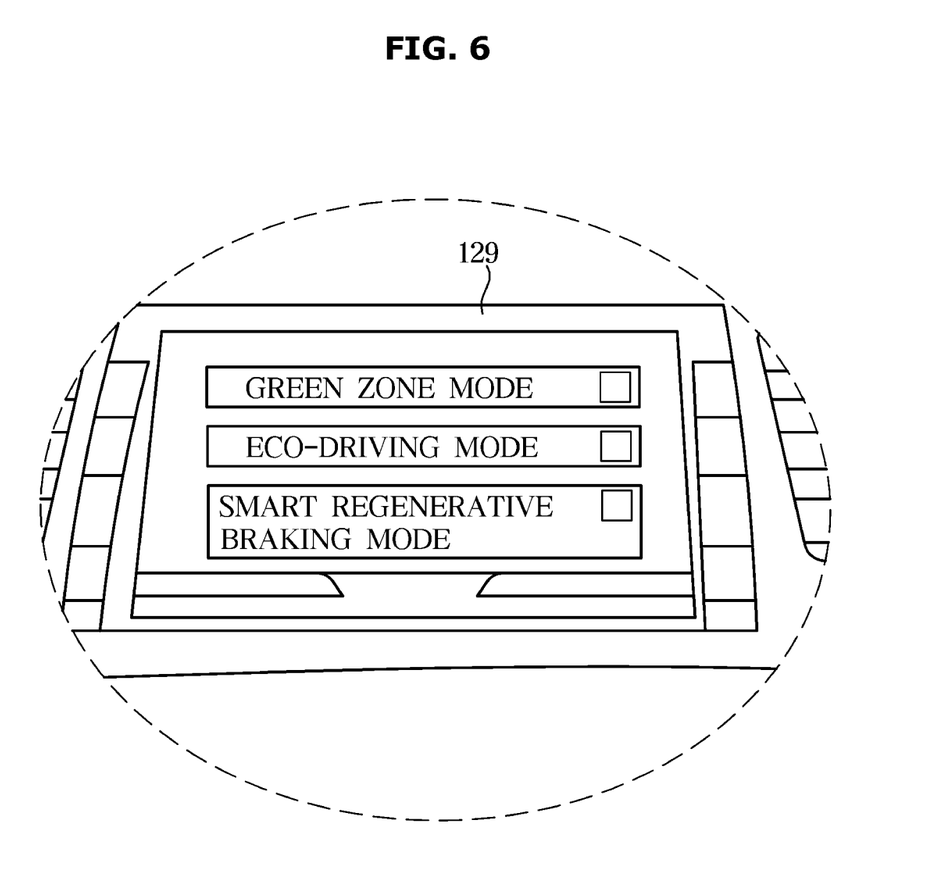
FIG. 6 is a schematic view illustrating a driving mode selection image for the convenience of a driver according to an exemplary embodiment of the present disclosure.
Figure 7:
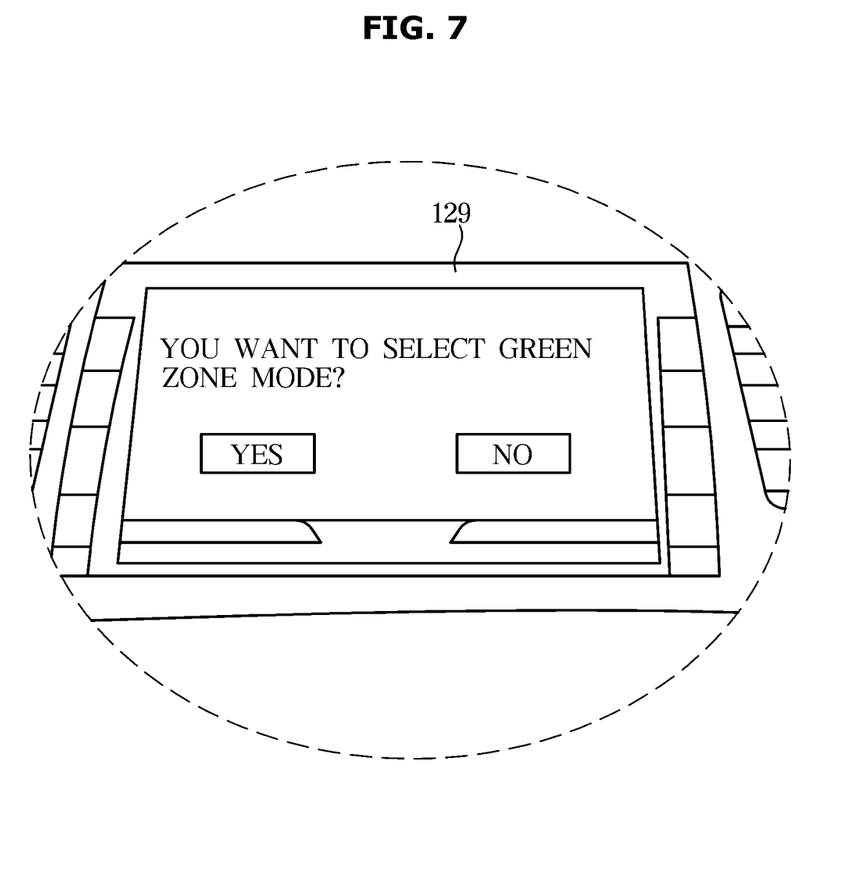
FIG. 7 is a schematic view illustrating an image for a Green Zone mode selection according to an exemplary embodiment of the present disclosure.

FIG. 6 is a schematic view illustrating a driving mode selection image for the convenience of a driver according to an exemplary embodiment of the present disclosure, and FIG. 7 is a schematic view illustrating an image for a Green Zone mode selection according to an exemplary embodiment of the present disclosure. As illustrated in FIG. 6, as may be seen from the information displayed on the user interface 129, the driver may select various driving modes such as the Green Zone mode, an eco-driving mode, and a smart regenerative braking mode for the convenience of the driver provided by the vehicle 100. However, the present disclosure is not limited to the driving modes for the convenience of the driver illustrated in FIG. 6, and the driving modes for the convenience capable of providing to each vehicle may also be applicable.

For example, when the driver selects "the Green Zone mode" among the selection modes illustrated in FIG. 6, selection or non-selection of the Green Zone mode may be input by the driver touching or selecting "YES" or "NO" through the display function of "Do you want to select the Green Zone mode?" on the touch screen, and whether to perform the Green Zone mode may be changed based on the input selection. In other words, when the driver selects "YES," the vehicle 100 may be configured to perform the Green Zone mode, and when the driver selects "NO," the vehicle 100 may be configured to not perform the Green Zone mode.

In addition, although not shown, similar to FIG. 7, selection or non-selection of turning off the Green Zone mode may be input by the driver touching "YES" or "NO" through the display function of "Do you want to turn the Green Zone mode off?" on the touch screen, and whether to turn the Green Zone mode off may be changed based on the input selection. In other words, when the driver selects "YES," the vehicle 100 may be configured to turn the Green Zone mode off, and when the driver selects "NO," the vehicle 100 may be configured to maintain the Green Zone mode.

Hereinafter, the control operation of the controller 181 when the driver selects the Green Zone mode will be described. When the driver selects the Green Zone mode, when the vehicle 100 reaches a preset threshold distance from the Green Zone, the controller 181 may be configured to display an indicator lamp capable of recognizing the Green Zone entry on the cluster 123 inside the vehicle 100.

In addition, when the driver selects the Green Zone mode, when the vehicle 100 is an electric vehicle, the controller 181 may be configured to maximize the increase in deceleration when entering the Green Zone mode, and may apply the maximum level of the regenerative braking to maximally defend the state of charge (SOC) of the battery. When the driver selects the Green Zone mode, the controller 181 may be configured to perform variable control of a virtual engine sound system (VESS).

Particularly, the controller 181 may be configured to variably adjust the volume of the virtual engine sound system based on whether the Green Zone to be entered is an outdoor area or an indoor area. For example, when the Green Zone in which the vehicle 100 intends to enter is an indoor area such as an underground parking lot, the controller 181 may be configured to output a volume of a first level, and thus, the volume magnitude may be adjusted to such an extent that the pedestrian may recognize the vehicle 100 and the volume does not exceed the noise regulation in the room.

Additionally, for example, when the Green Zone in which the vehicle 100 intends to enter is an outdoor area, the controller 181 may be configured to output a volume of a second level greater than the first level, and thus, the volume magnitude may be adjusted to allow the pedestrian to rapidly detect that the vehicle 100 is present. In other words, the controller 181 may be configured to vary the virtual engine sound system VESS based on whether the Green Zone is in the indoor or outdoor area, and thus, the pedestrian may recognize the vehicle 100 more easily. In addition, when the vehicle 100 enters the Green Zone, the controller 181 may be configured to automatically illuminate the emergency light (headlamp) of the vehicle 100 to induce the pedestrian to recognize the vehicle more easily.

Figure 8:
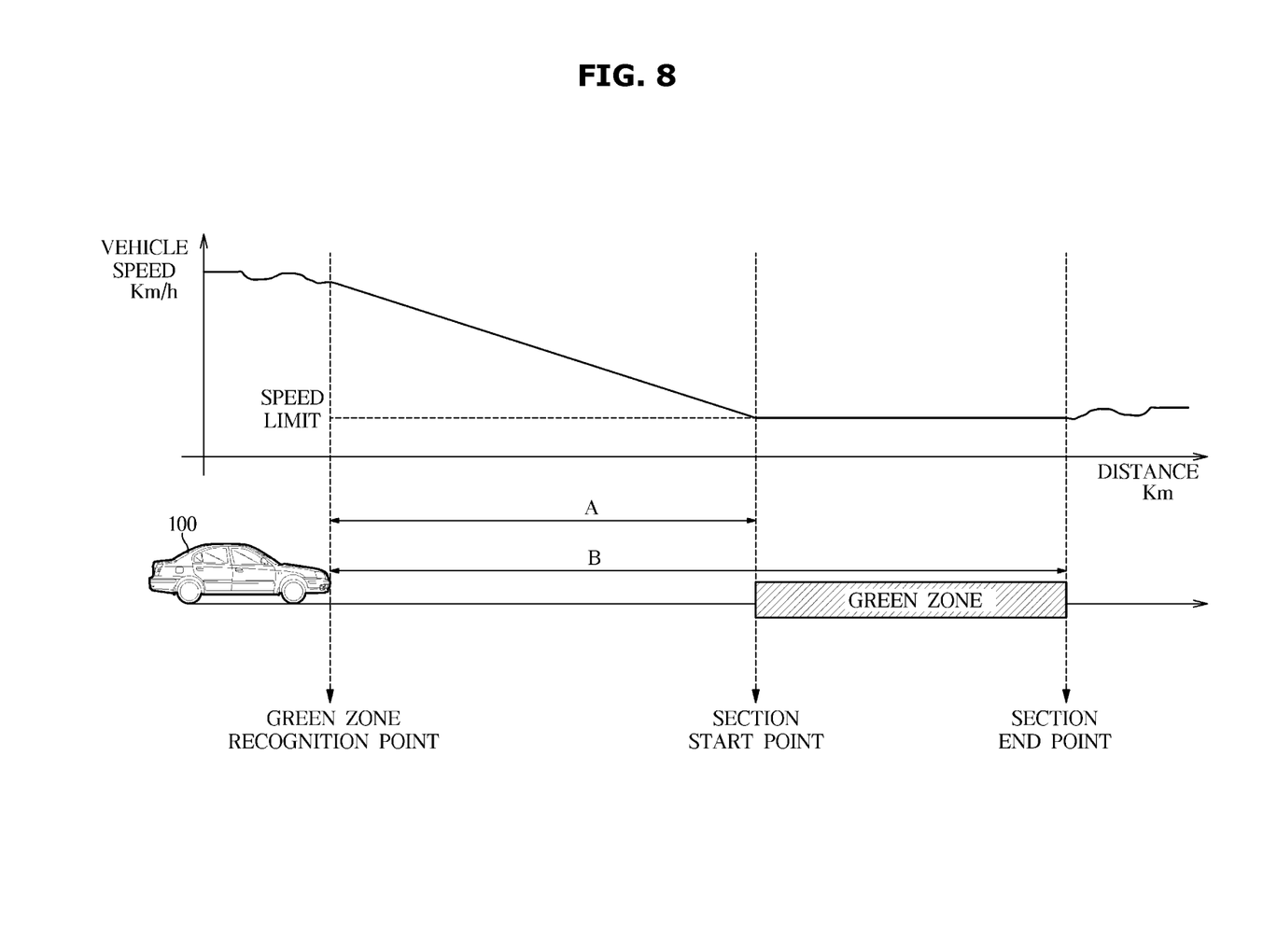
FIG. 8 is a schematic diagram illustrating deceleration control in a Green Zone entry of a vehicle according to an exemplary embodiment of the present disclosure.

Further, as illustrated in FIG. 8, the controller 181 may be configured to deceleration control to comply with the vehicle speed limit in the Green Zone from the Green Zone recognition point to the Green Zone section start point. This will be described in detail below. FIG. 8 is a schematic diagram illustrating deceleration control in a Green Zone entry of a vehicle according to an exemplary embodiment of the present disclosure.

For example, when the driver selects the Green Zone mode, FIG. 8 illustrates that the controller 181 may be configured to perform the vehicle speed deceleration to comply with the speed limit in the Green Zone (e.g., about 30 km/h) by performing the deceleration control from the Green Zone recognition point to the Green Zone section start point. Accordingly, the controller 181 may be configured to operate the vehicle 100 through the deceleration control to travel in accordance with the speed limit in the Green Zone from the Green Zone section start point to the Green Zone section end point.

In other words, the controller 181 may be configured to perform deceleration control to comply with the Green Zone speed limit before entering the Green Zone, may operate the vehicle 100 to travel at or below the vehicle speed limit after entering the Green Zone, and may no longer perform the vehicle speed limit upon passing the Green Zone section end point. The storage unit 182 may be configured to store location information regarding the Green Zone information including the map information, the road name in the map, and the road type, and store position information of a preset position and image information of a preset position.

The storage unit 182 may be implemented by at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto. The storage unit 182 may be implemented as a separate chip from the processor, and may be implemented as a single chip with the processor.

The actuator 185, configured to drive the vehicle 100 based on a control signal of the controller 181, may be configured to operate the electric equipment 1 included within the vehicle 100 and thus, regenerative braking control, virtual engine sound system control, headlight control, vehicle speed deceleration control, and the like may be performed. In the foregoing, each configuration for driving the vehicle 100 when the eco-friendly vehicle 100 according to an exemplary embodiment of the present disclosure enters the Green Zone has been described.

Figure 9:
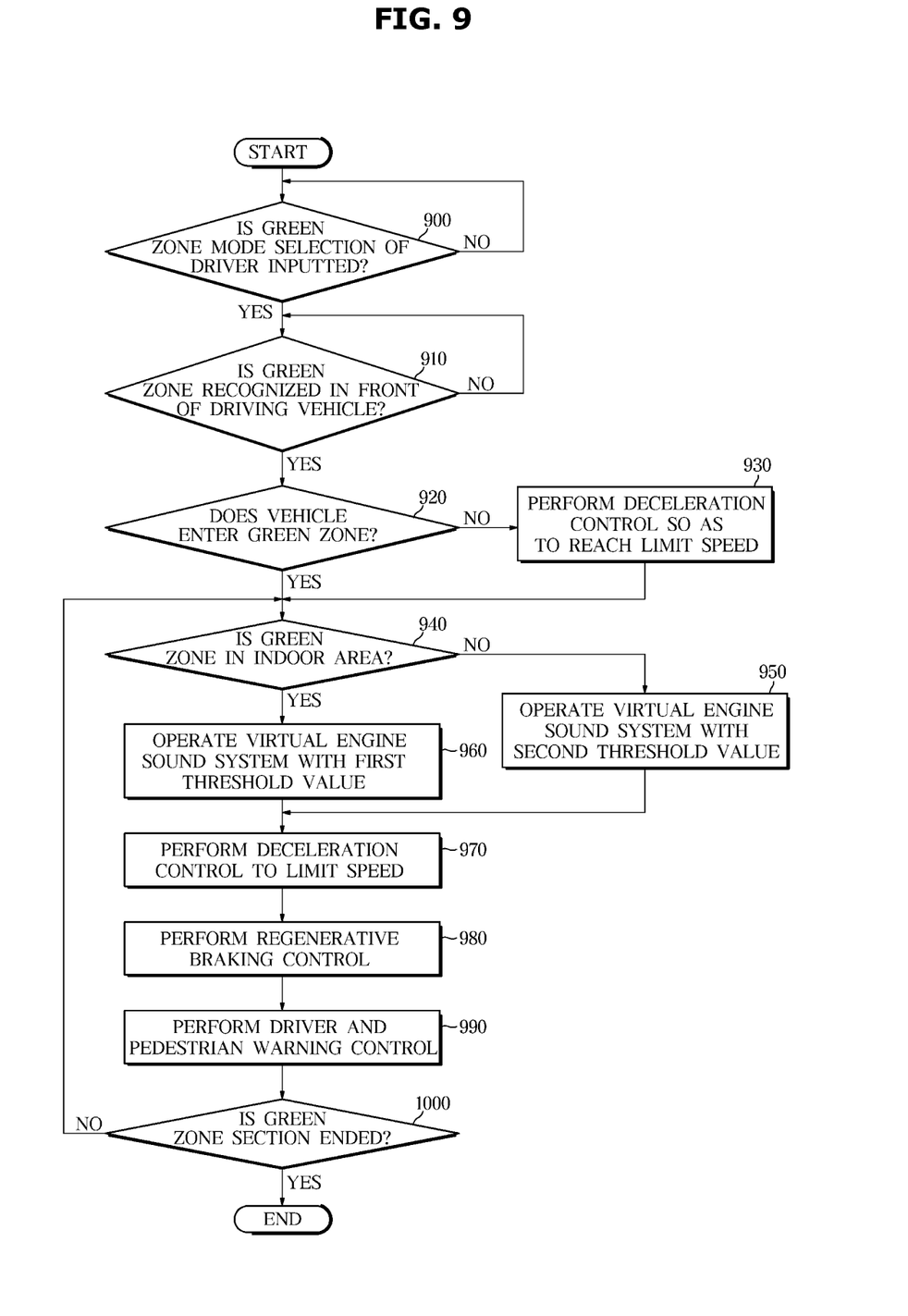
FIG. 9 is a flowchart illustrating a vehicle control method according to an exemplary embodiment of the present disclosure.

Hereinafter, a vehicle control method according to an exemplary embodiment of the present disclosure will be described. FIG. 9 is a flowchart illustrating a vehicle control method according to an exemplary embodiment of the present disclosure. The method described herein below may be executed by a controller. First, the vehicle 100 may be configured to receive the Green Zone mode selection from the driver (900). In particular, the vehicle 100 may be configured to receive the Green Zone mode selection of the user via the user interface 129 or the input unit 127 of the terminal 135. This has been described with reference to FIGS. 6 and 7, and thus a detailed description thereof will be omitted.

When the vehicle 100 recognizes that there s a Green Zone in front of the vehicle 100 (YES in 910) after the driver selects the Green Zone mode (YES in 900), the control of the vehicle 100 may be performed differently based on the Green Zone entry control and the type of the Green Zone. For example, if the vehicle 100 does not enter a Green Zone but recognizes that there is the Green Zone ahead (YES in 910, NO in 920), the vehicle 100 may be configured to perform deceleration control to reach the speed limit of the Green Zone located at the front or ahead of the vehicle (930).

On the other hand, if the vehicle 100 entered the green zone (YES in 910, YES in 920), the vehicle 100 may be configured to perform the operation level of the virtual engine sound system differently based on whether the Green Zone is in an indoor area or an outdoor area. For example, when the vehicle 100 entered the green zone (YES in 910, YES in 920), if the Green Zone is in an indoor area (YES in 960), the vehicle 100 may be configured to operate the virtual engine sound system included within the vehicle 100 at a first threshold value which is a threshold value within a range satisfying the indoor noise regulations (960).

As another example, when the vehicle 100 entered the green zone (YES in 910, YES in 920), if the Green Zone is in an outdoor area (NO in 960), the vehicle 100 may be configured to operate the virtual engine sound system included within the vehicle 100 with a second threshold value greater than the first threshold value and thus, a surrounding pedestrian may recognize the vehicle 100 (950). In addition, the vehicle 100 may be configured to perform deceleration control, regenerative braking control, and driver and pedestrian warning control (970 to 990) at the speed limit of the green zone during the Green Zone section, and all of the above controls may be performed simultaneously in the Green Zone section in parallel. In other words, the vehicle 100 may be configured to selectively and in parallel execute the control of 950 to 990 to the Green Zone end point passing through the Green Zone section (YES in 1000).

As is apparent from the above, the present disclosure may prevent safety accidents with pedestrians in advance that frequently occur due to low running noise of an eco-friendly vehicle. In particular, the present disclosure may allow a pedestrian to more easily recognize an eco-friendly vehicle by providing an emergency lighting or a virtual engine sound to warn the pedestrian when the eco-friendly vehicle enters a Green Zone. Further, the present disclosure may prevent safety accidents with pedestrians in advance that frequently occur by arbitrarily limiting a vehicle speed when an eco-friendly vehicle enters a Green Zone.

The exemplary embodiments disclosed with reference to the accompanying drawings have been described above. It will be understood by those skilled in the art that various changes in form and details may be made therein without departing from the spirit and scope of the present disclosure as defined by the appended claims. The disclosed exemplary embodiments are illustrative and should not be construed as limiting.

What is claimed is:

1. A vehicle, comprising:
   a position receiver configured to receive a position of the vehicle;
   a communicator configured to receive map information including Green Zone position information; and
   a controller configured to operate the vehicle to travel in a Green Zone mode from a section start point of a Green Zone to a section end point of the Green Zone when it is predicted that the vehicle enters the Green Zone from the position of the vehicle received from the position receiver,
   wherein the vehicle further comprises a virtual engine sound system,
   wherein the controller further configured to control the virtual engine sound system to operate based on the vehicle entering the Green Zone, and
   wherein the controller is configured to vary a volume of the virtual engine sound system to a first threshold value when the Green Zone is in an indoor area, and vary the volume of the virtual engine sound system to a second threshold value greater than the first threshold value when the Green Zone is in an outdoor area.

2. The vehicle according to claim 1, wherein the controller is configured to decelerate the vehicle from a preset distance before the vehicle enters the Green Zone to cause the vehicle to travel at a speed limit from the section start point of the Green Zone to the section end point of the Green Zone.

3. The vehicle according to claim 1, wherein the controller is configured to warn a driver or a pedestrian by turning on an emergency light of the vehicle or an indicator lamp of the vehicle when the vehicle enters the Green Zone.

4. The vehicle according to claim 3, wherein the controller is configured to adjust a regenerative braking of the vehicle to a maximum level when the vehicle enters the Green Zone.

5. The vehicle according to claim 1, further comprising:
   an input unit configured to receive a Green Zone mode selection input of a driver,
   wherein the controller is configured to operate the vehicle to travel in the Green Zone mode when a driver selection of the Green Zone mode is input.

6. The vehicle according to claim 1, further comprising:
   a sensor unit configured to sense obstacles in the vicinity of the vehicle,
   wherein the controller is configured to detect that the vehicle has entered the Green Zone when a pedestrian is sensed in the vicinity of the vehicle by the sensor unit.

7. The vehicle according to claim 6, wherein the sensor unit includes an image obtainer configured to photograph an obstacle including a pedestrian in the vicinity of the vehicle, or a speed limit sign in the vicinity of the vehicle.

8. The vehicle according to claim 7, wherein the controller is configured to decelerate the vehicle from the section start point of the Green Zone to the section end point of the Green Zone to a speed limit of the photographed speed limit sign in the vicinity of the vehicle.

9. The vehicle according to claim 5, wherein the controller is configured to operate the vehicle to travel in the Green Zone mode until a driver selection to turn the Green Zone mode off is received.

10. A vehicle control method, comprising:
    receiving, by a controller, a position of a vehicle;
    receiving, by the controller, map information including Green Zone position information;
    operating, by the controller, the vehicle to travel in a Green Zone mode from a section start point of a Green Zone to a section end point of the Green Zone when it is predicted that the vehicle enters the Green Zone from the received position of the vehicle; and
    operating, by the controller, a virtual engine sound system based on the vehicle entering the Green Zone,
    varying, by the controller, a volume of the virtual engine sound system to a first threshold value when the Green Zone is in an indoor area, and varying, by the controller, the volume of the virtual engine sound system to a second threshold value greater than the first threshold value when the Green Zone is in an outdoor area.

11. The vehicle control method according to claim 10, wherein the operating the vehicle to travel in the Green Zone mode from the section start point of the Green Zone to the section end point of the Green Zone includes:
    decelerating, by the controller, the vehicle from a preset distance before the vehicle enters the Green Zone to operate the vehicle to travel at a speed limit from the section start point of the Green Zone to the section end point of the Green Zone.

12. The vehicle control method according to claim 10, wherein the operating of the vehicle to travel in the Green Zone mode from the section start point of the Green Zone to the section end point of the Green Zone includes:
    warning, by the controller, a driver or a pedestrian by turning on an emergency light of the vehicle or an indicator lamp of the vehicle when the vehicle enters the Green Zone.

13. The vehicle control method according to claim 12, wherein the operating of the vehicle to travel in the Green Zone mode from the section start point of the Green Zone to the section end point of the Green Zone includes:
   adjusting, by the controller, a regenerative braking of the vehicle to a maximum level when the vehicle enters the Green Zone.

14. The vehicle control method according to claim 10, further comprising:
   receiving, by the controller, a Green Zone mode selection input of a driver; and
   operating, by the controller, the vehicle to travel in the Green Zone mode when a driver selection of the Green Zone mode is input.

15. The vehicle control method according to claim 10, further comprising:
   sensing, by the controller, obstacles in the vicinity of the vehicle; and
   recognizing, by the controller, that the vehicle has entered the Green Zone when a pedestrian is sensed in the vicinity of the vehicle.

16. The vehicle control method according to claim 15, wherein the sensing the obstacles in the vicinity of the vehicle includes:
   photographing, by the controller using an imaging device, an obstacle including a pedestrian in the vicinity of the vehicle, or a speed limit sign in the vicinity of the vehicle.

17. The vehicle control method according to claim 16, further comprising:
   decelerating, by the controller, the vehicle from the section start point of the Green Zone to the section end point of the Green Zone to a speed limit of the photographed speed limit sign in the vicinity of the vehicle.

18. The vehicle control method according to claim 14, further comprising:
   operating, by the controller, the vehicle to travel in the Green Zone mode until a driver selection to turn the Green Zone mode off is input.

\* \* \* \* \*